United States Patent [19]

Lipsky

[11] 4,313,117
[45] Jan. 26, 1982

[54] METHOD AND APPARATUS FOR ELECTRICALLY SCANNING AN ANTENNA ARRAY IN A MONOPULSE DF RADAR SYSTEM

[75] Inventor: Stephen E. Lipsky, Kings Point, N.Y.

[73] Assignee: General Instrument Corporation, Clifton, N.J.

[21] Appl. No.: 50,346

[22] Filed: Jun. 21, 1979

[51] Int. Cl.³ ............................................. G01S 3/32
[52] U.S. Cl. .................................................... 343/119
[58] Field of Search ........................................ 343/119

[56] References Cited

U.S. PATENT DOCUMENTS

| | | | |
|---|---|---|---|
| 2,992,428 | 7/1961 | White | 343/119 |
| 3,167,774 | 1/1965 | DeRosa | 343/119 |
| 3,179,940 | 4/1965 | Zauscher | 343/119 |
| 3,218,642 | 11/1965 | Newhouse et al. | 343/119 X |
| 3,237,195 | 2/1966 | Schiffman | 343/119 X |
| 3,238,530 | 3/1966 | Carre et al. | 343/119 |
| 3,319,218 | 5/1967 | Zefting | 343/119 X |
| 3,720,946 | 3/1973 | Chow et al. | 343/119 |
| 3,946,382 | 3/1976 | Kossiakoff et al. | 343/5 VQ |
| 4,044,352 | 8/1977 | Wilmot | 343/5 VQ |

Primary Examiner—Malcolm F. Hubler
Attorney, Agent, or Firm—James & Franklin

[57] ABSTRACT

From an antenna array of a plurality of fixed, narrow beamwidth antennas, geographically oriented to provide omnidirectional coverage, first and second sets of antennas are selected in sequence. The first selected set includes several pairs of oppositely oriented antennas. The signals received by the antennas in each pair of the first selected set are combined and each of the combined signals is connected to a different one of a number of matched receiver channels. If the logarithmic video output signals from the receiver channels meet certain rules of acceptance, the monopulse ratio, formed by subtracting the outputs of the channels receiving the strongest and next strongest signals, is digitized and stored. This ratio represents the angular difference between the direction of the received signal and the direction of one of the antennas in the pair of the first set generating the strongest signal. However, it cannot be determined which of the antennas in the pair has the forelobe response and, thus, the ratio contains a 180° ambiguity. To resolve the ambiguity, a second antenna set is selected to include only the pair of the first selected set which were connected to the channel receiving the strongest signal. Each antenna in the second set is connected to the input of a different channel, the outputs of which are compared. The stronger signal is considered to be the forelobe response, and information relating to the sector of the antenna with the stronger signal is used to resolve the ambiguity present in the stored ratio.

36 Claims, 5 Drawing Figures

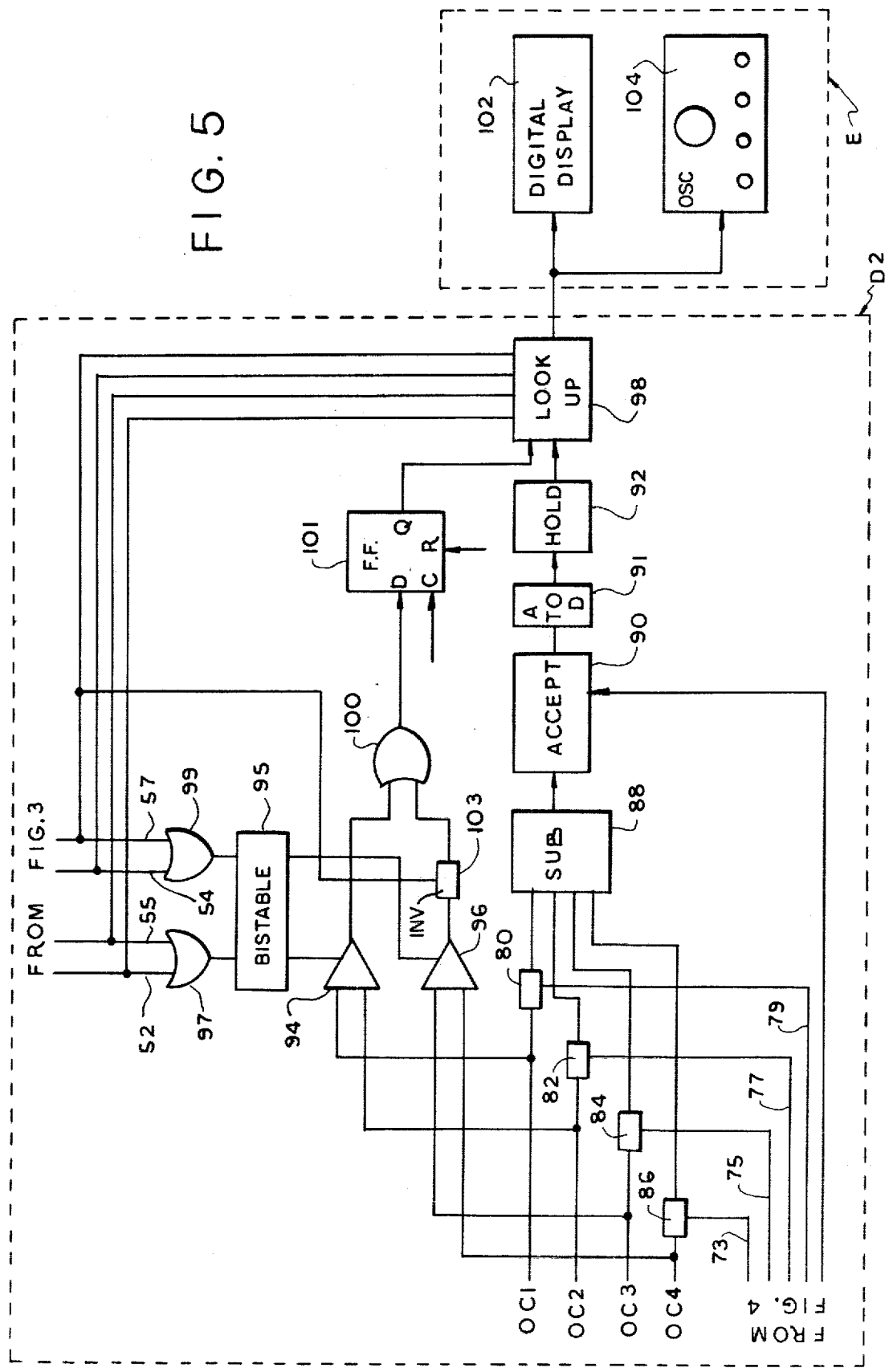

METHOD AND APPARATUS FOR ELECTRICALLY SCANNING AN ANTENNA ARRAY IN A MONOPULSE DF RADAR SYSTEM

BACKGROUND OF THE INVENTION

The present invention relates to monopulse direction finding (DF) radar systems and, more particularly, to a method and apparatus for electrically scanning an antenna array in a monopulse direction finding radar system to provide omniazimuthal coverage and unambiguous angle of arrival information.

Monopulse direction finding radar systems are well known in the art. Such systems use a simultaneous lobing technique wherein a pair of physically separated or offset overlapping antenna beams are utilized at the same time, instead of a single antenna beam which is monitored on a time shared basis. The overlapping antenna beams may be generated by two physically separate antennas or a single lens antenna illuminated by two adjacent feeds. Angle of arrival information is determined by measuring the relative phase or the relative amplitude of a single echo pulse received on each of the beams. The use of a monopulse system is highly desirable in certain applications, particularly in the electronic warfare art, because such a system is immune to pulse-to-pulse amplitude variations between received signals caused by scanning and/or propagation effects.

Scanning of the azimuth may be achieved in a monopulse system by a mechanically rotating pair of narrow beamwidth antennas. Ideally, the overlapping antenna beams would have a field of view limited to the direction in which same are pointed at any instant in time. As a practical matter, however, this is not the case because the antennas also have backlobes. A backlobe is a response to a signal in the direction which is the reverse or opposite of the direction in which the antenna is pointed. Backlobe responses are usually weaker than the response to a signal in the direction in which the antenna is pointed (forelobe response). However, sometimes the presence of a backlobe response makes an unambiguous angle of arrival determination difficult because it cannot be determined whether the received echo signal represents a strong signal picked up on a weak backlobe, or a weak signal picked up on the desired forelobe.

When the antennas are rotated by a mechanical drive, a two-channel rotary joint is required. However, rotary joints and other interconnections necessary in this instance often have narrow frequency responses, usually limited to an octave. Thus, wideband multi-octave antennas, covering a wide frequency reception range, cannot be readily used in mechanically driven scanning systems.

Two separate techniques have been utilized to eliminate the ambiguity in the angle of arrival determination and increase the range of frequency response in monopulse DF radar systems. The first technique combines a fixed omniazimuthal antenna and a rotating narrow beamwidth antenna, each connected to a different channel in a dual channel receiver. The gains of the channels are adjusted such that the response on the channel receiving the output of the omniazimuthal antenna is greater than the weakest backlobe of the narrow beamwidth antenna. A received signal to be processed to obtain the angle of arrival information is deemed acceptable only if the output of the channel connected to the narrow beamwidth antenna is greater than the output of the channel connected to the omniazimuthal antenna. In this manner, backlobe responses are inhibited.

This technique will theoretically permit unambiguous angle of arrival determinations. However, as a practical matter, the physical separation and differences in the characteristics between the two antennas causes unwanted variations in the channel responses. These variations in channel responses make the above method of backlobe suppression subject to error. Errors are present because it cannot be guaranteed that the output of the channel connected to the omniazimuthal antenna will always be less than the forelobe response, but greater than the backlobe response, of the channel connected to the narrow beamwidth antenna, for a signal in the direction in which the narrow beamwidth antenna is pointed. Thus, completely unambiguous angle of arrival determinations cannot be achieved with this technique.

The second technique for permitting unambiguous angle of arrival determinations utilizes four 90° beamwidth stationary spiral antennas, geographically oriented to cover 360°, in four quadrants. Four reception channels are required, one for each antenna. Specific rules for signal acceptance are utilized for backlobe response suppression. When a signal is received on an antenna connected to one of the four associated receiver channels, it is determined if the signal is also present on either of the channels connected to antennas adjacent to the first antenna. If the signal is present on a channel connected to an adjacent antenna and is less in strength than the first, the signal is accepted and the monopulse ratio of strongest to adjacent next strongest is formed. However, if the signal is present on the antenna channel oriented in the opposite direction, the strength of the two signals is compared and since the channels are not adjacent, the channel with the strongest signal thereon is considered to be the desired channel. The adjacent next strongest signal is then sought to form the monopulse ratio. In this instance, the next strongest signal may be suppressed and the signal on the boresight channel processed, or both signals may be discarded and the determination made on the next pulse.

The four channel, four antenna system of signal detection is feasible when moderate DF accuracies are required. However, due to the wide beamwidths of the antennas and practical limitations on channel balancing in such a system, the degree of articulation (dB change per degree of azimuth coverage) and the sensitivity of the system are limited.

If better accuracy with omniazimuthal coverage is desired, without physical movement of the antennas, many more fixed antennas of narrower beamwidth, and an equal number of additional receiver channels, would be required. Narrower beamwidth antennas result in enhanced accuracy because of the increased dB per degree of azimuth coverage. Moreover, in a multi-channel system where there is a practical limit on the balance between the channels, system unbalance contributes less error for antennas of narrower beamwidth.

Thus, increasing the number of antennas and the number of receiver channels will permit unambiguous angle of arrival determination and improved accuracy, without decreasing the coverage or reducing frequency response. However, increasing the number of receiver channels is not a practical solution to the accuracy problem. The electronics required for a system having more than four balanced reception channels would be prohibitively expensive. Further, since DF systems are designed for use on mobile craft, most usually for airborne guidance systems and the like, the added space required by the extra electronics and the weight thereof would severely limit the applications for which such systems could be used.

It is, therefore, a prime object of the present invention to provide a method and apparatus for electrically scanning an antenna array in a monopulse DF radar system to provide omnidirectional coverage.

It is a second object of the present invention to provide a method and apparatus for electrically scanning an antenna array in a monopulse DF radar system wherein unambiguous angle of arrival information is obtained.

It is a third object of the present invention to provide a method and apparatus for electrically scanning an antenna array in a monopulse DF radar system wherein enhanced accuracy is achieved.

It is a fourth object of the present invention to provide a method and apparatus for electrically scanning an antenna array in a monopulse DF radar system wherein omniazimuthal coverage is achieved without mechanical rotation of antennas.

It is a fifth object of the present invention to provide a method and apparatus for electrically scanning an antenna array in a monopulse DF radar system wherein reception coverage is achieved over a multi-octave frequency range.

It is a sixth object of the present invention to provide a method and apparatus for electrically scanning an antenna array in a monopulse DF radar system wherein backlobe suppression is reliably achieved.

It is another object of the present invention to provide a method and apparatus for electrically scanning an antenna array in a monopulse DF radar system wherein unity probability of intercept is achieved.

It is a still further object of the present invention to provide a method and apparatus for electrically scanning an antenna array in a monopulse DF radar system wherein omnidirectional coverage is achieved simultaneously with backlobe suppression.

It is a still further object of the present invention to provide a method and apparatus for electrically scanning an antenna array in a monopulse DF radar system wherein scanning of the antenna array is automatically controlled.

In accordance with the present invention, method and apparatus for electrically scanning the antenna array in a monopulse DF radar system is provided. The antenna array has a plurality of fixed narrow beamwidth antennas geographically oriented to provide omnidirectional coverage. From the antenna array, first and second sets of antennas are selected in sequence.

The first set of selected antennas includes a plurality of pairs of oppositely oriented antennas. The RF outputs of the antennas in each of the antenna pairs in the first selected set are combined in a power divider to obtain a combined output signal for each pair. The combined output signal for each pair is then connected to the input of a different one of several matched receiver channels. In each channel, the combined output signal connected thereto is filtered, detected and logarithmically amplified.

The logarithmic outputs from each receiver are tested to determine if adjacent antennas have received the strongest and next strongest signals. If they have, a monopulse ratio formed by subtracting the logarithmic outputs from the receiver channels connected to the antenna pairs receiving the strongest and next strongest signals, is accepted for further processing. This ratio, however, cannot alone determine the angle of arrival because each antenna pair in the first selected set, and, thus, the antenna pairs generating the strongest and next strongest signals, includes antennas which are oppositely oriented, that is, offset by 180°. Thus, the monopulse ratio contains an 180° ambiguity.

In order to resolve this ambiguity, a second set of antennas is selected to include the two antennas which comprised the pair in the first selected set which generated the strongest combined signal. Each antenna in the second selected set is connected to the input of a different receiver channel.

The logarithmic outputs of the receiver channels connected to the antennas of the second selected set are compared to determine which represents the forelobe response. The signal representing the backlobe response is suppressed. The quadrant in which the antenna producing the forelobe response is situated is noted.

When the ratio is converted into angle of arrival information, the information noted relating to the quadrant in which is situated the antenna demonstrating the forelobe response is used to resolve the ambiguity present in the previously formed monopulse ratio. In this manner, unambiguous angle of arrival information is obtained with omnidirectional coverage.

Selection of the antenna sets is achieved by an electronically controlled switching circuit. The switching circuit comprises first and second sets of interconnected electronically controllable switches. The first set includes eight single pole, double throw switches, each having an RF input and two RF outputs. The RF input of each switch in the first set is connected to a different one of the eight antennas. The RF outputs of the switches in the first set are operably connected to the inputs of a second set of switches comprising four single pole, triple throw switches. Each switch in the second set has three RF inputs and an RF output. The RF output of each switch in the second set is connected to the input of one of the receiver channels.

The switching circuit is electronically controlled by a scan control circuit which generates biasing signals to control the states of the switches. In this manner, the appropriate antennas for each set are selected.

To the accomplishment of the above, and to such other objects as may hereinafter appear, the present invention relates to a method and apparatus for electrically scanning an antenna array in a monopulse DF radar system as described in the following specification and recited in the annexed claims, taken together with the accompanying drawings, wherein like numerals refer to like parts and in which:

FIG. 5 is a block diagram of the monopulse ratio forming circuit, ambiguity resolving circuit, the angle calculation circuit and display circuits of the present invention.

The present invention is closely related to the invention disclosed in my co-pending application Ser. No. 35,599, filed May 3, 1979, now U.S. Pat. No. 4,257,047, entitled "Method and Apparatus for Electrically Scanning an Antenna Array in a Monopulse DF Radar System", and assigned to the assignee herein. The reader is referred to that application for an explanation of a system which utilizes a related technique to accomplish results similar to those of the present invention.

Figure 1:
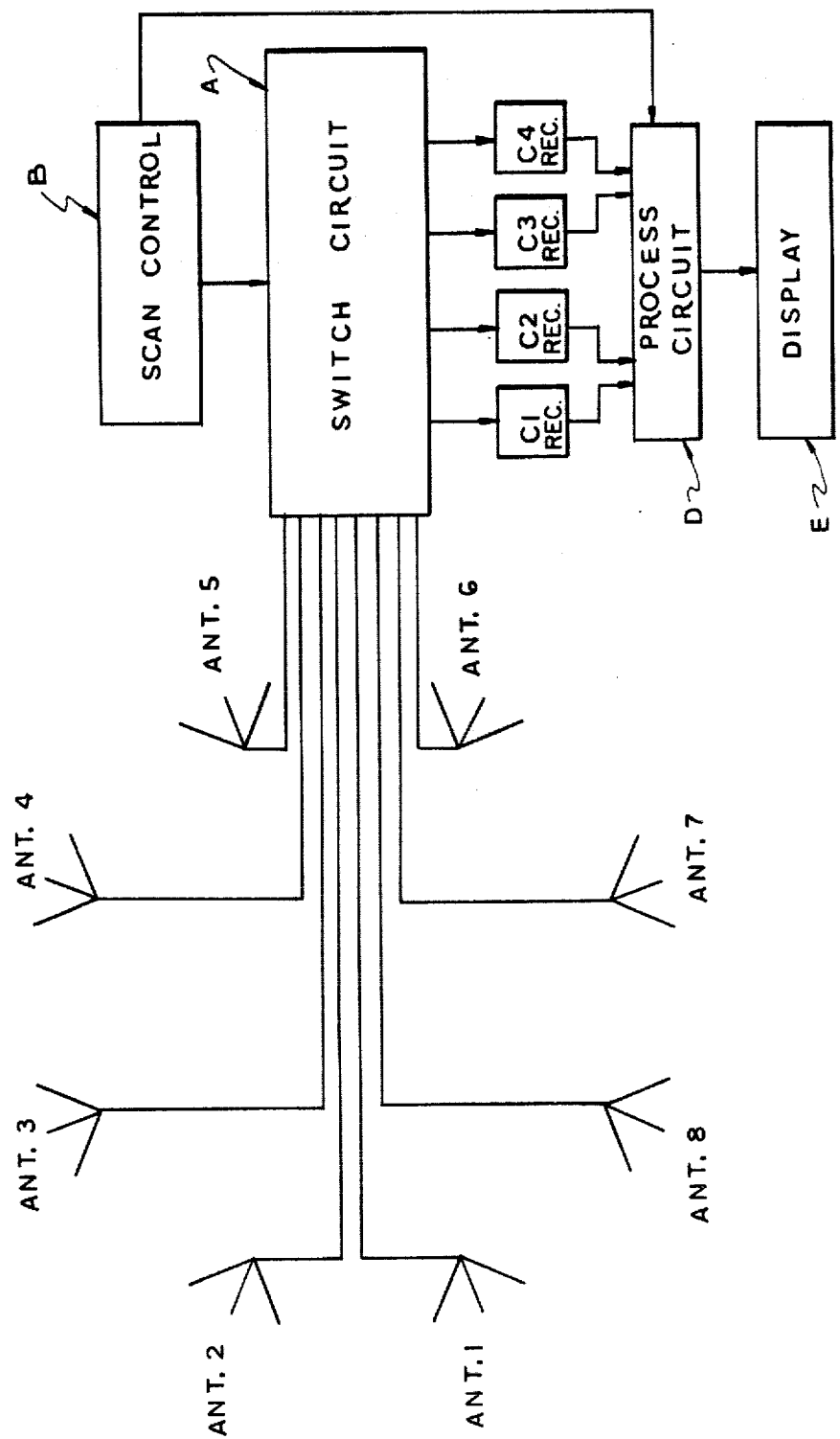
FIG. 1 is a block diagram of the overall system of the present invention.

As seen in FIG. 1, the system of the present invention includes an antenna array of a plurality of fixed, narrow beamwidth antennas, geographically oriented to provide omnidirectional coverage. The antenna array consists of eight antennas, $ANT_1$, $ANT_2$, $ANT_3$, $ANT_4$, $ANT_5$, $ANT_6$, $ANT_7$ and $ANT_8$, respectively. Each of the antennas is permanently positioned with respect to the others and has a beamwidth covering a 45° arc. Thus, when considered in aggregate, the eight antennas cover a 360° field of view. The RF output from each antenna is connected to a switching circuit, generally designated A. Switching circuit A serves to select the appropriate antenna outputs, in accordance with the commands from a scan control circuit, generally designated B, connected thereto. The selected antenna outputs are respectively connected to one of four matched receiver channels, generally designated C. Each of the receiver channels C filters and detects the RF input signal thereto. After the detection, the output video, which may be pulse or CW, is fed to a logarithmic amplifier which generates the logarithm of the detected video signal for each channel. The logarithmic video output from each channel is connected to a processing circuit, generally designated D. Processing circuit D includes an acceptance circuit which determines whether adjacent antenna pairs have received the strongest and next strongest signals. The processing circuit includes a monopulse ratio forming circuit. If the rules of acceptance are met, the monopulse ratio, formed during the selection of the first set by subtracting the logarithmic video outputs of the receiver channels C which generate the strongest and next strongest output signals, is accepted and held. Selection of the second set is then made and the sector of the antenna with the forelobe response is noted. The circuit also includes an ambiguity resolving circuit. Information relating to the ratio and the sector of the antenna having the forelobe response in the second set is processed to produce a digital signal representative of the angle of arrival. This digital signal is connected to a display circuit, generally designated E, which may comprise circuitry designed to generate a numerical representation of the angle of arrival or graphical display thereof, or both.

Figure 2:
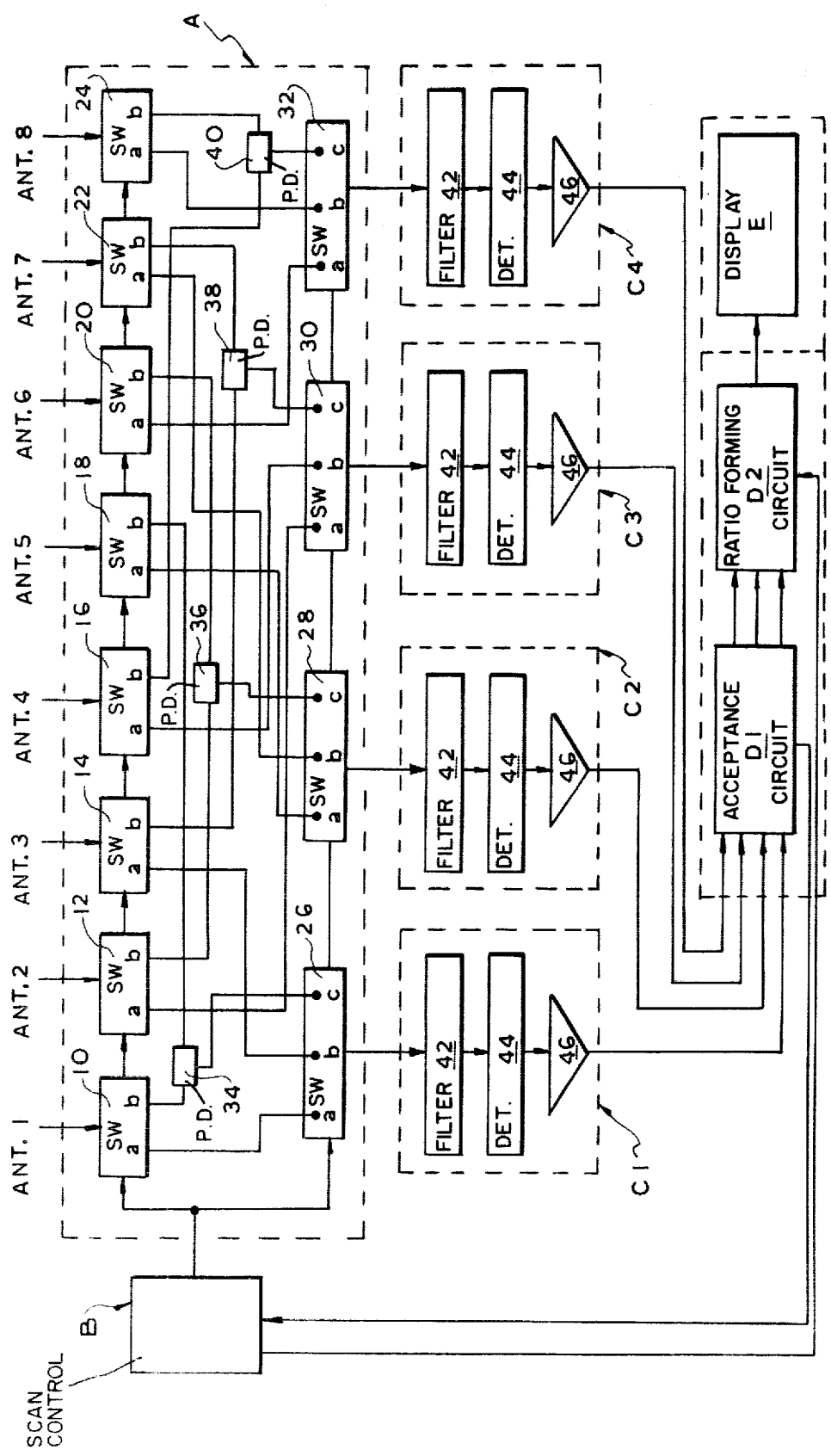
FIG. 2 is a more detailed block diagram of the switching system and receiver channels of the system of the present invention.

The switching circuit A for the present invention is illustrated in greater detail in FIG. 2. Switching circuit A comprises two tiers or sets of switches. Only the RF terminals of the switches are shown in FIG. 2. The first tier of switches comprises eight single pole, double throw switches 10, 12, 14, 16, 18, 20, 22 and 24, each of which has its RF input connected to the output of a different one of the antennas $ANT_1$, $ANT_2$, $ANT_3$, $ANT_4$, $ANT_5$, $ANT_6$, $ANT_7$ and $ANT_8$, respectively. Each of the switches 10, 12, 14, 16, 18, 20, 22, 24 has two RF outputs, designated "a" and "b" respectively. Switches 10, 12, 14, 16, 18, 20, 22, 24 may be any electronically controllable single pole, double throw switch, such as is presently available from Alpha Industries as Model MT 3681-H or the like.

The second tier or set of switches comprises four single pole, triple throw switches 26, 28, 30 and 32. Each of the switches 26, 28, 30 and 32 has three RF inputs and a single RF output. The RF inputs are designated "a", "b" and "c", respectively. Switches 26, 28, 30 and 32 may be any electronically controllable single pole, triple throw RF switch such as is presently available from Alpha Industries and designated as MT 3654-H.

The "a" outputs of switches 10 through 24 serve to connect the RF output of the individual antenna connected thereto with one of the RF inputs of switches, 26, 28, 30 and 32. More specifically, the "a" output of switch 10 is connected to the "a" input of switch 26; the "a" output of switch 12 is connected to the "a" input of switch 30; the "a" output of switch 14 is connected to the "b" input of switch 26; the "a" output of switch 16 is connected to the "b" input of switch 30; the "a" output of switch 18 is connected to the "a" input of switch 28; the "a" output of switch 20 is connected to the "a" input of switch 32; the "a" output of switch 22 is connected to the "b" input of switch 28; and, the "a" output of switch 24 is connected to the "b" input of switch 32.

When the first set of antennas is selected, the RF outputs of oppositely oriented antenna pairs are combined. The combination of the RF outputs of the oppositely oriented antennas in each pair is accomplished by a power divider such as is commercially available from Norsal Industries as Model No. 8121. Four power dividers 34, 36, 38 and 40 are provided. Each of the power dividers 34, 36, 38, 40 has two inputs and a single output. The inputs of power divider 34 are connected to the "b" output of switch 10 and the "b" output of switch 18, respectively, and the output of power divider 34 is connected to the "c" input of switch 26. The inputs to power divider 36 are connected to the "b" output of switch 12 and the "b" output of switch 20, respectively, and the output of power divider 36 is connected to the "c" input of switch 28. The inputs of power divider 38 are connected to the "b" output of switch 14 and the "b" output of switch 22, respectively, and the output of power divider 38 is connected to the "c" input of switch 30. The inputs of power divider 40 are connected to the "b" output of switch 16 and the "b" output of switch 24, respectively, and the output of power divider 40 is connected to the "c" input of switch 32.

The first selected antenna set comprises four pairs of oppositely oriented antennas. Antennas $ANT_1$ and $ANT_5$ form a first pair; antennas $ANT_2$ and $ANT_6$ form a second pair; antennas $ANT_3$ and $ANT_7$ form a third pair; and antennas $ANT_4$ and $ANT_8$ form a fourth pair. The RF output of the antennas in each pair are combined to form a combined output signal which is then connected to the input of one of the receiver channels $C_1$, $C_2$, $C_3$ or $C_4$. More specifically, the combined output from antennas $ANT_1$ and $ANT_5$ is connected to the input of receiver channel $C_1$; the combined output of antennas $ANT_2$ and $ANT_6$ is connected to the input of receiver channel $C_2$; the combined output of antennas $ANT_3$ and $ANT_7$ is connected to the input of receiver channel $C_3$; and, the combined output of antennas $ANT_4$ and $ANT_8$ is connected to the input of receiver channel $C_4$.

In order to accomplish this result, the scan control circuit B generates biasing signals to the bias inputs of each of the switches 10 through 24 in the first set, and each of the switches 26 through 32 in the second set. When the first set of antennas are selected, these biasing signals cause each of the switches 10–24 in the first set to connect their RF inputs to their respective "b" outputs. The biasing signals from scan control circuit B also cause each of the switches 26, 28, 30 and 32 to connect their "c" inputs to their RF outputs. The result is that the RF outputs of antennas $ANT_1$ and $ANT_5$ are connected, through switches 10 and 18, to power divider 34, the output of which is connected through switch 26 to the input of receiver channel $C_1$. Antennas $ANT_2$ and $ANT_6$ are connected, through switches 12 and 20, to power divider 36, the output of which is connected, through switch 28, to the input of receiver channel $C_2$. Antennas $ANT_3$ and $ANT_7$ are connected, through switches 14 and 22, to power divider 38, the output of which is connected, through switch 30, to the input of receiver channel $C_3$. Antennas $ANT_4$ and $ANT_8$ are connected, through switches 16 and 24, to power divider 40, the output of which is connected, through switch 32, to the input of receiver channel $C_4$.

The second selected antenna set will comprise the antennas in the oppositely oriented antenna pair, previously selected in the first selected set, the combined output of which generated the strongest receiver channel output. Thus, prior to the selection of the second antenna set, a decision is made as to which receiver channel generated the strongest video output signal, that is, which antenna pair had the strongest combined RF signal associated therewith. This decision is made in acceptance circuit $D_1$, described in detail below, which is connected to receive the outputs of each of the receiver channels. When the receiver channel having the strongest output signal is determined, this information is transferred to scan control circuit B to enable scan control circuit B to appropriately bias switches 10 through 32 to select the appropriate oppositely oriented antenna pair for the second selected antenna set.

Thus, the second selected antenna set may comprise either antennas $ANT_1$ and $ANT_5$, or $ANT_2$ and $ANT_6$, or $ANT_3$ and $ANT_7$, or $ANT_4$ and $ANT_8$, depending upon which receiver channel generates the strongest output signal. When the second selected antenna set is to be selected, scan control circuit B biases switches 10–24 in the first switch set to condition each of these switches to connect its RF input to its "a" output. In this manner, antennas $ANT_1$ and $ANT_3$ are connected to the "a" and "b" inputs of switch 26, through switches 10 and 14, respectively. Antennas $ANT_5$ and $ANT_7$ are connected to the "a" and "b" inputs of switch 28, through switches 18 and 22, respectively. Antennas $ANT_2$ and $ANT_4$ are connected to the "a" and "b" inputs of switch 30, through switches 12 and 16, respectively. Antennas $ANT_6$ and $ANT_8$ are connected to the "a" and "b" inputs of switch 32, through switches 20 and 24, respectively.

Switches 26, 28, 30 and 32 are conditioned to connect either the "a" or "b" inputs thereof to the output thereof. For instance, if the second selected set of antennas comprises antennas $ANT_1$ and $ANT_5$, switches 26 and 28 are conditioned to connect their "a" inputs to their outputs. Switches 30 and 32 receive no bias signals and are, thus, not actuated. If antennas $ANT_2$ and $ANT_6$ are selected for the second antenna set, switches 30 and 32 are conditioned to connect their "a" inputs to their outputs, while switches 26 and 28 are not actuated. If antennas $ANT_3$ and $ANT_7$ are selected for the second set, switches 26 and 28 are conditioned to connect their "b" inputs to their outputs and switches 30 and 32 are not actuated. If antennas $ANT_4$ and $ANT_8$ are selected for the second antenna set, switches 30 and 32 are conditioned to connect their "b" inputs to their outputs, while switches 26 and 28 are not actuated. In this manner, the RF output of each antenna in the second selected set is connected to the input of a different one of two receiver channels. Since only two antennas exist in the second selected set, only two receiver channels are actuated, the other two receiver channels being inoperative.

Each of the receiver channels $C_1$, $C_2$, $C_3$, $C_4$ comprises a filter 42, a detector 44 and a logarithmic video amplifier 46. A signal connected to the input of the receiver channel is filtered, detected and then logarithmically amplified to form a logarithmic video output signal at the output terminal of the receiver channel. Each receiver channel is identical. The outputs of the receiver channels $C_1$, $C_2$, $C_3$, $C_4$ are connected to the inputs of acceptance circuit $D_1$.

Figure 3:
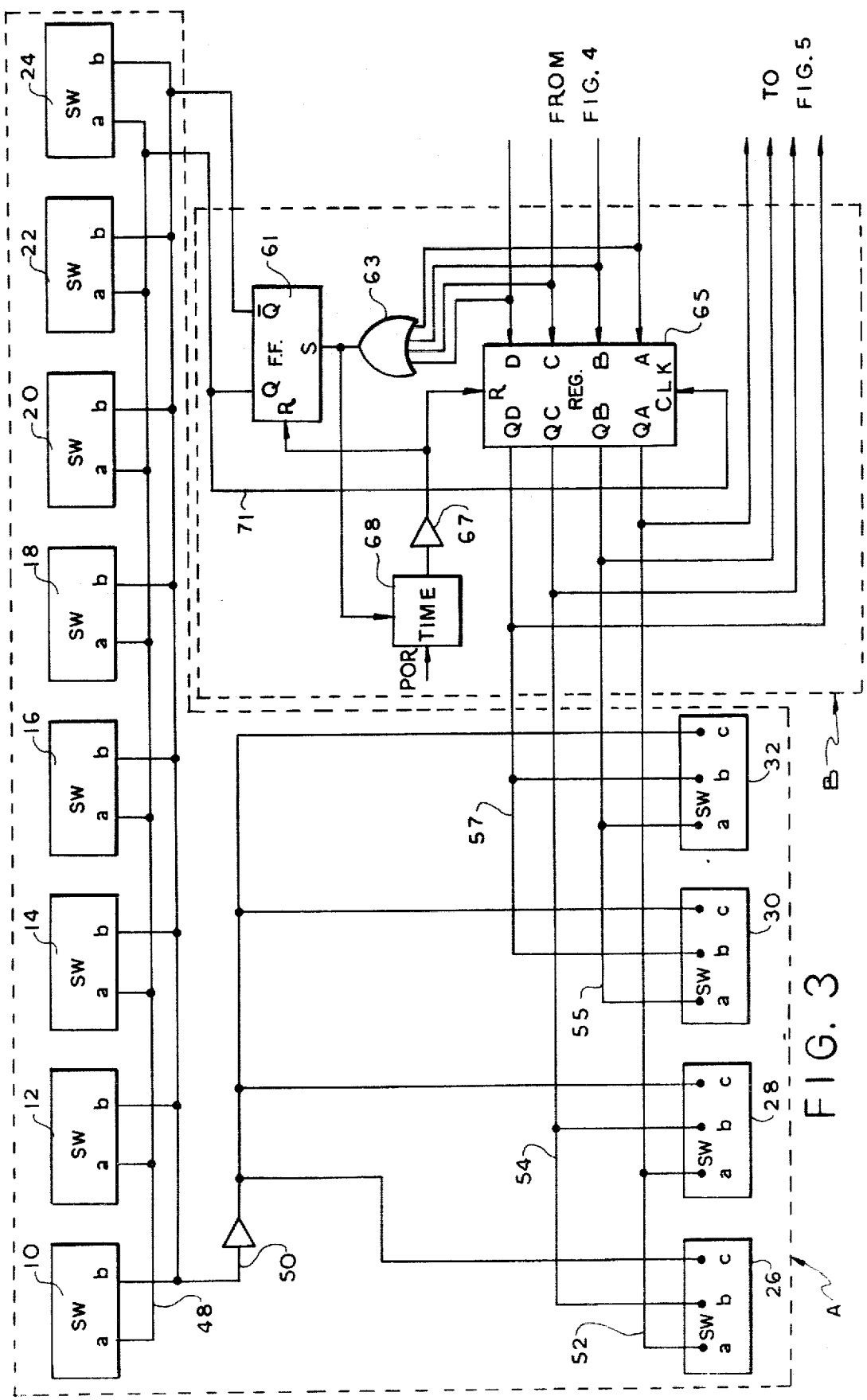
FIG. 3 is a block diagram of the scan control circuit of the system of the present invention.

The scan control circuit B is shown in detail in FIG. 3 as are the bias inputs of the switches from switching circuit A and the interconnections therebetween. In FIG. 3, the switches 10–32 are shown only with their bias inputs, that is, the input which determines the state of the switch. The condition of each switch is determined by the bias signal applied to its bias inputs. For convenience in understanding FIG. 3, the switches and their bias terminals are designated with the same numerals as the RF terminals were designated in FIG. 2. However, it should be appreciated that these are not the same terminals but corresponding terminals, the terminals designated in FIG. 2 being the RF terminals of the switches, whereas the terminals designated in FIG. 3 are the bias terminals which determine the states of the switches.

The "a" bias terminal of each of the switches 10, 12, 14, 16, 18, 20, 22 and 24 are connected to a bias line 48. The "b" bias terminals of switches 10, 12, 14, 16, 18, 20, 22, 24 and the "c" bias terminals of switches 26, 28, 30 and 32 are connected to a bias line 50. The "a" bias terminals of switches 26 and 28 are connected to a bias line 52. The "b" bias terminals of switches 26 and 28 are connected to a bias line 54. The "a" bias terminals of switches 30 and 32 are connected to a bias line 55. The "b" bias terminals of switches 30 and 32 are connected to a bias line 57.

Bias lines 48 and 50 are respectively connected to the Q and Q outputs of a bistable or flip-flop circuit 61. The "set" input S of bistable circuit 61 is connected to the output of an OR gate 63. OR gate 63 has four inputs which are respectively connected to each of the four outputs from acceptance circuit $D_1$, shown in FIG. 4. The outputs of acceptance circuit $D_1$ are also respectively connected to the "A", "B", "C" and "D" inputs of a maximum determination amplifier hold register 65. Each of the four output lines from acceptance circuit $D_1$ represents one of the receiver channels. One of these outputs will have a logic "1" or high signal applied thereto representing the receiver channel with the strongest output signal. The other three lines will have a logic "0" or low signal applied thereto, indicating that same do not represent the receiver channel with the strongest output signal.

The "reset" inputs R of flip-flop 61 and register 65 are both connected through an amplifier 67 to the output of a timing circuit 68. The inputs to timing circuit 68 are connected to the output of OR gate 63 and to a power on reset (POR) signal generator, not shown.

Timing circuit 68 may be any commercially available timer, such as No. 54161 available from Texas Instruments Corporation. Flip-flop circuit 61 may be any commercially available maximum detector flip-flop, such as No. 5474 available from Texas Instruments Corporation. Register 65 may be any commercially available maximum determination amplifier hold register, such as No. 54175 available from Texas Instruments Corporation.

Initially, with the application of power, a power on reset (POR) signal is generated to timing circuit 68 which enables the timing circuit 68 to generate an output pulse to the "reset" input R of flip-flop 61 and to the "reset" input R of register 65. The "reset" inputs R of the flip-flop 61 and register 65 are D.C. inputs and, thus, require no clock input. The Q outputs of both the register 65 and the flip-flop 61 are initially in the "0" state. A zero or low signal applied to the bias input of a switch will condition the switch not to conduct through its corresponding RF terminal. However, a "1" logic level applied to a bias input of a switch will condition the switch to conduct through its corresponding RF terminal.

Because the two outputs Q and $\bar{Q}$ of flip-flop 61 are always complimentary, only one will be at the logic "1" state, while the other will be at the logic "0" state. When the Q output of circuit 61 is high, the "a" bias inputs of each of the switches 10 through 24 will be conditioned to actuate their corresponding RF terminals, whereas when output $\bar{Q}$ of flip-flop 61 is high, the "b" bias input terminals of switches 10–24 and the "c" bias input terminals of switches 26–32 will actuate their corresponding RF input terminals.

When flip-flop 61 is reset by the timing signal from circuit 69, the $\bar{Q}$ output thereof becomes high or logic "1". This causes each of the switches 10–24 to connect their respective RF inputs to their "b" outputs and switches 26–32 to connect their "c" RF inputs to their respective outputs. In this manner, switching circuit A is conditioned by scan control circuit B to select the first set of antennas.

The first set of antennas will include four oppositely oriented antenna pairs, $ANT_1$ and $ANT_5$; $ANT_2$ and $ANT_6$; $ANT_3$ and $ANT_7$; and $ANT_4$ and $ANT_8$. The RF output of each of the antennas in each antenna pair is combined in a power divider, as described above, and then connected to the input of a different one of the receiver channels $C_1$, $C_2$, $C_3$, $C_4$. The output of each of the receiver channels is connected to acceptance circuit $D_1$ which determines which channel output has the strongest signal. The four output lines from acceptance circuit $D_1$ represent each of the receiver channels, respectively. One of the output lines will have a logic "1" representing that it is the channel with the strongest signal, whereas the other three output lines will be logic "0", representing that they are not the channel with the strongest signal.

These lines are coupled to the flip-flop 61 through OR gate 63 which may be any commercially available OR gate, such as No. 5432 available from Texas Instruments Corporation. The output of OR gate 63 is connected to the S input of flip-flop 61 and a pulse generated at the output of OR gate 63 sets flip-flop 61 such that the Q output thereof goes high (logic "1") and the $\bar{Q}$ output thereof goes low (logic "0"). A positive bias signal on the Q output of flip-flop 61 conditions each of the switches 10–24 to connect its RF input to its "a" output terminal. This is because the "a" bias inputs of each of the switches 10–24 are connected to bias line 48 which, in turn, is connected to the Q output of flip-flop 61.

The second selected set of antennas will include the two antennas in the previously selected antenna pair which received the strongest signal. The second antenna set is selected by appropriately conditioning switches 26, 28, 30 and 32 to connect the "a" RF outputs of the switches in the first switch set (connected to the antennas of the pair of antennas in the first selected antenna set which received the strongest signal) to the inputs of two of the receiver channels.

The negative-to-positive going transition of the Q output of flip-flop 61 generates a clock pulse along line 71 to the clock input of register 65. This causes register 65 to store the data from the four output lines of acceptance circuit $D_1$, one of which will be a logic "1" (indicating the channel with the strongest signal) and the other three of which will be a logic "0". Register 65 then generates the appropriate output signal on one of its four output terminals Q(a), Q(b), Q(c), Q(d) to condition switches 26, 28, 30 and 32.

Output Q(a) of register 65 is connected by bias line 52 to the "a" bias inputs of switches 26 and 28. If a logic "1" is applied to bias line 52, switches 26 and 28 will connect the RF outputs of antennas $ANT_1$ and $ANT_5$, respectively, to the inputs of receiver channels $C_1$ and $C_2$. If a logic "1" is generated at output terminal Q(b) of register 65, this signal will be applied to bias line 55 and, thus, to switches 30 and 32 to cause same to connect the RF outputs of antennas $ANT_2$ and $ANT_6$, respectively, to the inputs of channels $C_3$ and $C_4$. Output Q(c) from register 65 is connected through bias line 54 to switches 26 and 28. When a high logic signal appears thereon, this causes switches 26 and 28 to connect the RF outputs of antennas $ANT_3$ and $ANT_7$, respectively, to the inputs of channels $C_1$ and $C_2$. The Q(d) output of register 65 is connected through line 57 to switches 30 and 32. When a logic "1" signal is applied from output Q(d) of register 65 along line 57, this causes switches 30 and 32 to connect the RF outputs of antennas $ANT_4$ and $ANT_8$, respectively, to the inputs of channels $C_3$ and $C_4$.

Figure 4:
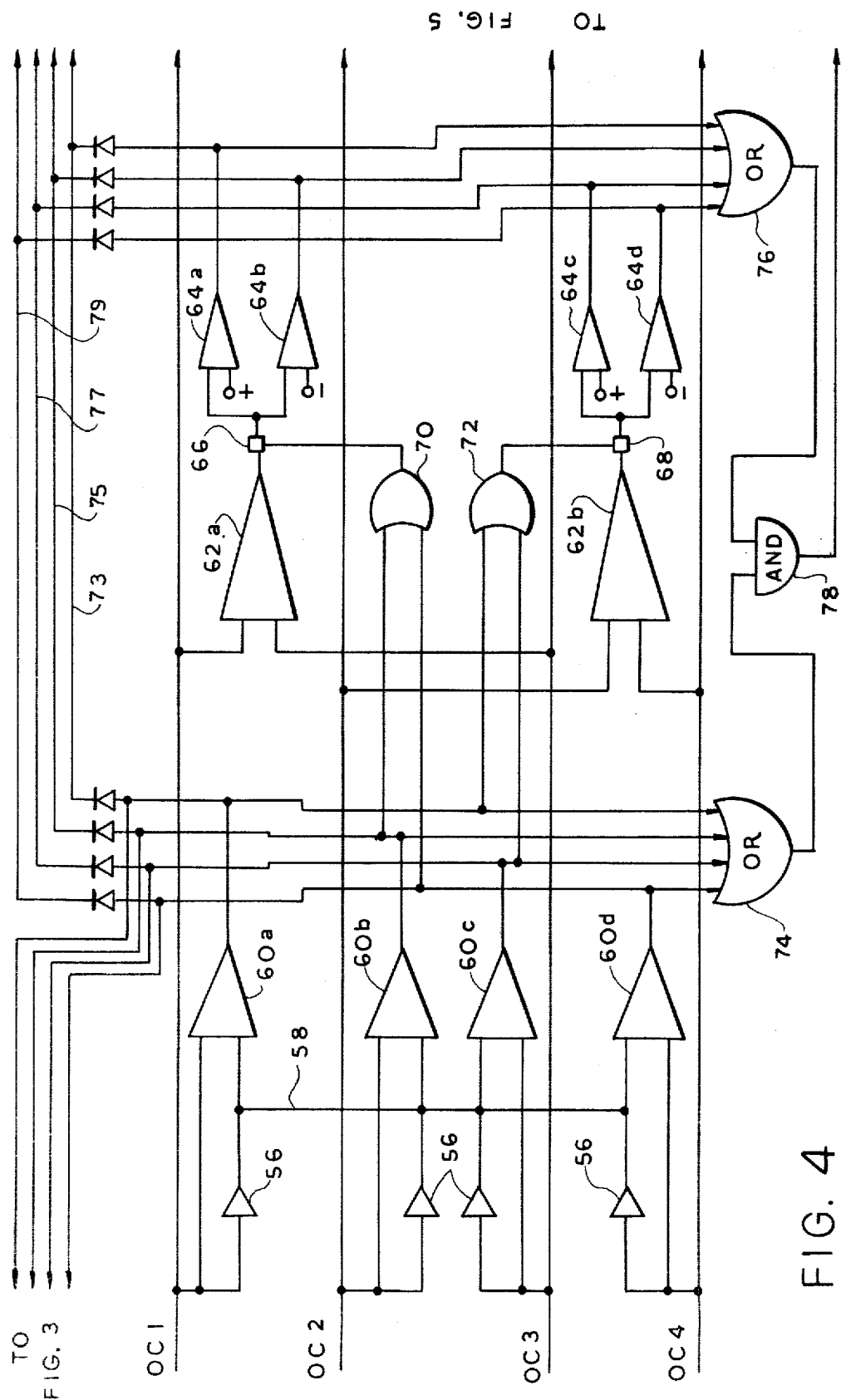
FIG. 4 is a block diagram of the acceptance circuit of the system of the present invention.

The purpose of the acceptance circuit $D_1$, illustrated in FIG. 4, is to determine if adjacent antenna pairs have received the strongest and next strongest signals, and to indicate which antenna pairs have the strongest and next strongest signals. This is done by first determining which of the output signals from the receiver channels, designated $OC_1$, $OC_2$, $OC_3$, $OC_4$, respectively, is the strongest and which is the next strongest, and then whether the receiver channels with the strongest and next strongest output signals represent adjacent antenna pairs.

Each of the outputs $OC_1$, $OC_2$, $OC_3$, $OC_4$ are connected to the input of a different one of four OR gate amplifiers 56. The outputs of each of the amplifiers 56 are tied together on line 58 upon which will always appear the largest values of the four input signals, offset by a preset amount. As a practical matter, the larger value is slightly offset to insure that it is less than the compared value. Each of the four input signals are then compared to the magnitude on line 58 by comparators 60a, 60b, 60c, 60d. Each of the comparators 60 may be a Model LM 106-H, available from Texas Instruments Corporation or National Semiconductor Corp., or the like. The output of a comparator 60 will be a high or "1", if the compared video output from the channel connected thereto is greater than the offset sum. Since this will only occur for the strongest signal, as compared to the maximum of the preceding stages, identification of which of the channel outputs is strongest can be determined by noting which of the four outputs of the respective comparators 60 is high or logic "1".

Next, it is determined which channel output has the next strongest signal and if the antenna pair receiving the next strongest signal is adjacent the pair receiving the strongest signal. This is done by a pair of operational amplifiers 62a, 62b. The inputs of operational amplifier 62a are $OC_1$ and $OC_3$, and the inputs of operational amplifier 62b are $OC_2$ and $OC_4$, respectively. The output of each of the operational amplifiers 62 will either be positive or negative, depending upon the comparative magnitude of the input signals thereto. For example, if $OC_1$ is greater than $OC_3$, the operational amplifier 62a, connected to receive these signals, will have an output which is positive. On the other hand, if $OC_1$ is less than $OC_3$, the output of operational amplifier 62a will be negative. A typical device which could be used to perform this function is available from Harris and Intersil Co., as Model Type 2-2520, or the like.

The output of each of the operational amplifiers 62a, 62b is connected to one of the inputs of each of a pair of operational amplifiers 64a, 64b, and 64c, 64d, respectively. The other input of each of the amplifiers 64a and 64c is connected to a positive source, whereas the other input of each of the amplifiers 64b and 64d is connected to a negative source. The outputs of operational amplifiers 62a, 62b are compared with the source inputs to amplifiers 64a, 64b; and 64c, 64d, respectively.

For instance, assume $OC_2$ to be determined as the strongest signal, indicating that antenna pair $ANT_2$ and $ANT_6$ received the strongest signal. This would require that the two adjacent channel outputs $OC_1$ and $OC_3$ be tested to determine which is the next strongest. This is achieved by gates 66, 68, located at the outputs of amplifiers 62a and 62b, respectively. The outputs of amplifiers 60a and 60c are connected to the inputs of an OR gate 72. Likewise, the outputs of amplifiers 60b and 60d are connected to the inputs of an OR gate 70. The output of OR gate 70 controls gate 66 and the output of OR gate 72 controls gate 68. Only one of the inputs to gates 70 and 72 will be high, indicating which signal is strongest. The OR gate which receives the high signal will serve to turn on the gate connected thereto. For example, assume that $OC_2$ is the strongest signal, then gate 70 will receive a high signal at one of its inputs and cause gate 66 to turn on. Since gate 72 receives no high signal, gate 68 is off. Operational amplifier 62a compares $OC_1$ with $OC_3$. If $OC_1$ is greater than $OC_3$, a positive output passes through gate 66 to the inputs of amplifiers 64a and 64b. On the other hand, if $OC_3$ is greater than $OC_1$, then a negative output is applied through gate 66 to the inputs of amplifiers 64a and 64b. If the input to amplifier 64a is positive, the output thereof will be high, indicating that $OC_1$ is the next strongest signal. On the other hand, if the input to amplifier 64b is negative, the output thereof will be high, indicating that the next strongest signal is $OC_3$. The operation of amplifiers 64c and 64d is identical.

The outputs of amplifiers 60a, 60b, 60c, 60d are fed to a four-input OR gate 74; the outputs of operational amplifiers 64a, 64b, 64c and 64d are connected to inputs of a four-input OR gate 76. The outputs of OR gate 74 and 76 are connected to the inputs of an AND gate 78. The output of AND gate 78 is the acceptance signal. This signal will only be present when it has been determined that a strongest signal and a next strongest signal are present and that these signals are on adjacent antenna pairs. If this condition does not exist, no acceptance signal is generated at the output of AND gate 78. The output of gate 78 is fed to circuit $D_2$ which includes the monopulse ratio generating a circuit.

As noted above, it is necessary that hold register 65 of scan circuit B receive information concerning which receiver channel generated the strongest output signal to determine the antennas for the second antenna set. As will now be appreciated, this information is already contained at the outputs of amplifiers 60a, 60b, 60c, 60d. For this reason, these outputs are individually connected, by means of four output lines, to the A, B, C and D inputs of hold register 65. The line with the logic "1" signal applied thereto represents the channel output with the strongest signal and, thus, the antenna pair receiving the strongest signal.

In order to form the monopulse ratio, a monopulse ratio forming circuit, which forms a part of processing circuit $D_2$ (illustrated in FIG. 5), is provided. The logarithmic output of the channel receiver having the next strongest signal is subtracted from the logarithmic output of the channel receiver having the strongest signal. In order to perform this subtraction, it is necessary that the monopulse ratio forming circuit $D_2$ receive information as to which logarithmic outputs are the strongest and next strongest. This information is conveyed by means of four output buses 73, 75, 77, 79. Output bus 73 is connected (through diodes) to the outputs of amplifier 60a and 64a. If the outputs of either amplifier 60a or 64a are high, a logic "1" will appear on line 73 indicating that the logarithmic output of channel $C_1$ is either the strongest or the next strongest. In a similar manner, output line 75 is connected, via diodes, to the outputs of amplifiers 60b and 64b; output bus 77 is connected, through diodes, to the outputs of amplifiers 60c and 64c; and, output bus 79 is connected, through diodes, to the outputs of amplifiers 60d and 64d. Thus, two of the output buses 73, 75, 77, 79 will have logic "1" signals applied thereto, indicating that the corresponding channel has either the strongest or next strongest signal output, whereas the other two output buses will have logic "0" signals applied thereto, representing that the corresponding channel outputs are neither the strongest or next strongest.

During the time when the first selected set of antennas are connected to the respective receiver channels, the logarithmic outputs $OC_1$, $OC_2$, $OC_3$ and $OC_4$ are fed to the inputs of four gates 80, 82, 84, 86. Gates 80, 82, 84, 86 are controlled, respectively, by the signals applied to lines 73, 75, 77, 79 connected to the control inputs thereof. As noted above, two of the four output bus lines will have logic "1" signals thereon (representing the strongest and next strongest channels) and the other lines will have logic "0" signals applied thereto. A logic "1" signal applied to the output buses 73, 75, 77, 79 will cause the gate connected thereto to close. Thus, gates 80, 82, 84, 86 serve to connect only the logarithmic outputs of the strongest and next strongest channels to a subtraction circuit 88, connected to the outputs of the gates. Subtraction circuit 88 subtracts the logarithmic outputs of the strongest and next strongest signals to form the monopulse ratio which is then fed to the input of an acceptance gate 90.

As indicated previously, the output of AND circuit 78 of acceptance circuit $D_1$ (FIG. 4) will be a logic "1" only if adjacent antenna pairs have received the stronget and next strongest signals. If this is the case, the monopulse ratio formed in subtraction circuit 88 is accepted because the control input of acceptance gate 90 receives the output of AND gate 78. If the monopulse ratio is accepted, acceptance gate 90 transfers same to an analog-to-digital converter 91 which generates a digital representation to a hold circuit 92, wherein the information is retained as the second antenna set is selected. It should be noted that the digital information stored in hold circuit 92 contains a 180° ambiguity because the logarithmic outputs of the strongest and next strongest receiver channels represent two pairs of oppositely oriented antennas. Thus, the monopulse ratio indicates that the angle of arrival is a particular number of degrees from one of the antennas in the antenna pair of the first selected set which generated the strongest signal, but it is at this point impossible to determine which of the antennas has received the forelobe response. Therefore, it cannot, at this time, be determined which of the two possible oppositely oriented sectors the emitter is located. This ambiguity is resolved by the second antenna selection.

As noted above, in the second antenna set, the oppositely oriented pair of antennas from the previously selected set which generated the strongest signal are selected. To resolve the ambiguity in the stored digital information, all that is required is to determine which of the two selected antennas in the second set is receiving the stronger signal, that is, which antenna represents the forelobe response and which represents the backlobe response. Since only two antennas are selected for the second antenna set, only two of the receiver channels are operative, the other two channels being inoperative. Thus, either receiver channels $C_1$ and $C_2$ will be operative, or receiver channels $C_3$ and $C_4$ will be operative.

In order to make the required comparisons, two comparators 94 and 96 are utilized. The inputs of comparators 94 are connected to receive the logarithmic outputs $OC_1$ and $OC_2$ from channels $C_1$ and $C_2$, respectively. The inputs to comparator 96 are connected to receive the logarithmic outputs $OC_3$ and $OC_4$ from receiver channels $C_3$ and $C_4$, respectively. A bistable circuit 95 is utilized to enable the appropriate comparator. The inputs of bistable circuit 95 are, respectively, connected to the outputs of a pair of OR gates 97, 99 which, in turn, are connected, respectively, to lines 52, 55 and 54, 57 from FIG. 3. The outputs of comparators 94, 96 are applied to the inputs of an OR gate 100 which, in turn, is connected to a 180° resolution bistable circuit 101. The output of circuit 101, along with lines 52, 54, 55 and 57, are applied to the inputs of a look-up table 98 which may be a programmable read only memory or the like. This circuit resolves the ambiguity in the digital signal from hold circuit 92, also applied to its input.

For example, assume that a maximum signal is detected on channel A (antennas 1 and 5) and the next maximum signal is detected on channel B (antennas 2 and 6) on the first antenna selection. The digital signal present in hold circuit 92 will contain a 180° ambiguity, that is, the emitter is located in the 247.5° through 270° sector or the 67.5° through 90° sector. Since in the second antenna set, antennas 1 and 5 will be chosen, line 52 from FIG. 3 will be high and channels A and B will be operative, generating possible $OC_1$ and $OC_2$ signals to the input of comparator 94. Circuit 95 enables comparator 94 because of the high signal on line 52.

Comparator 94 will determine whether $OC_1$ or $OC_2$ is higher, and thus, which of the antennas 1 or 5 has received the stronger signal. If $OC_1$ is higher, indicating antenna 1 to be boresight, comparator 94 generates a high output. If $OC_2$ were higher, comparator 94 would generate a low output. The channel representing the antennas 4 and 8 is an exception to the 180° resolution and, in this case, a high signal on line 57 is used to invert the output of comparator 96 via an inverter 103 located between the output of comparator 96 and the input of gate 100.

Since, in this example, the emitter lies in the 247.5° to 270° region, the output of comparator 94 is high. At the appropriate time, the 180° resolution flip-flop 101 is strobed and set. The output of circuit 101 defines 247.5° through 270° as the sector.

The digital information in hold circuit 92, which is the digital difference signal, defines the location of the emitter in the 247.5° to 270° sector. If this difference signal is a maximum value, then the emitter is at boresight or 247.5°. If, on the other hand, the difference value is close to zero, then the emitter is close to the crossover region, 270°. The difference signal is directly proportional to the degree offset from the maximum defined antenna pulse.

The gating of sector information with the digitized difference information in the "look-up" table 98, which receives information as to which pair of antennas is selected in the second selection, which of the two selected antennas has the greater signal and the digitized difference signal, results in the DF information. All of the gating can be accomplished by a Programmable Read Only Memory. The inputs to this circuit define the PROM address which in turn defines the degree value.

The output of circuit 98 is a digital signal which contains the necessary DF information. If a numerical angle of arrival determination is required, the output of circuit 98 is supplied to the input of a numerical display 102, such as a commercially available LED display or the like.

On the other hand, if a graphical representation of the angle of arrival is required, the output of circuit 98 may be fed to the input of a conventional oscilloscope type display 104, such as Hewlett-Packard Model 2645A or the like, which accepts the digital information in appropriate format and contains the necessary interface circuitry, such as a EIA RS232C interface or the like, to convert the digital information into a form which can be graphically displayed. In some instances, both numerical and graphical representations are required and, for this reason, FIG. 5 illustrates display circuit E as having both numerical and graphical display equipment. However, it should be noted that either or both types of equipment may be utilized, depending upon which type of information is desired.

It should now be appreciated that the present invention permits omnidirectional coverage with increased accuracy of DF measurement by permitting a greater number of narrower beamwidth antennas to be scanned and, thus, allowing greater articulation (that is, more dB of change per degree of azimuth coverage), without sacrificing system sensitivity, as would be the case with fewer antennas spaced wider apart. In addition, the number of receiver channels necessary in processing the multiplicity of antennas is reduced substantially, thus effecting a substantial cost savings.

Further, the invention provides a means to utilize monopulse techniques to normalize, that is, remove the effects of pulse-to-pulse variation of the received signals, permitting time to be exchanged for system complexity since effectively, signals appear as constant illuminators permitting the scan to take place, which could not be accommodated if both signal variation and receiver/antenna variation were present. Moreover, the necessity for a two channel rotary joint, which would be required if a monopulse pair were to be rotated by the scan set up by mechanical means, is eliminated. Still further, wide-band, multi-octave antennas may be utilized, thus covering a wide frequency range. This feature is not available when mechanical systems are utilized, since rotary joints and other connections may be limited to octave band coverage.

While only a single embodiment of the present invention has been disclosed herein for purposes of illustration, it is obvious that many variations and modifications could be made thereto. It is intended to cover all of these variations and modifications which fall within the scope of the present invention, as defined by the following claims:

I claim:

1. A method for obtaining direction finding information in a monopulse radar system of the type having a multi-channel receiver and an antenna array including a plurality of fixed, narrow beamwidth antennas geographically oriented to provide omnidirectional coverage, the method comprising the steps of:
    (a) selecting a first set of antennas from the array, said first selected set comprising a plurality of pairs of oppositely oriented antennas;
    (b) combining the RF output signals of the antennas in each pair of said first selected set to form a combined output signal for each pair;
    (c) processing each of said combined output signals in a different receiver channel to form a first processed output signal for each channel;
    (d) selecting the strongest and next strongest first processed output signals;
    (e) forming a monopulse ratio from the selected first processed output signals;
    (f) selecting a second set of antennas from the array, said second selected set comprising the pair of antennas from the previously selected first antenna set generating the strongest first processed output signal;
    (g) processing the RF output signals of the antennas in said second selected set, in different receiver channels, to form a second processed output signal for each channel;
    (h) selecting the stronger of the second processed output signals;
    (i) determining the sector of the antenna in said second set connected to the channel generating the selected second processed signal; and
    (j) combining information relating to the determined sector with the monopulse ratio to determine the angle of arrival sector.

2. The method of claim 1, wherein the step of selecting a first set of antennas comprises the step of simultaneously selecting all of the antennas in the array.

3. The method of claim 1, wherein the step of combining the RF outputs comprises, for each pair of oppositely oriented antennas, the steps of: adding the RF outputs of each antenna in the pair and dividing the sum of the RF outputs to form the combined output signal.

4. The method of claim 1, wherein the step of processing each of the combined output signals comprises the steps of filtering the combined output signal; detecting the filtered signal and logarithmically amplifying the detected signal to form a logarithmic video output signal.

5. The method of claim 1, wherein the first processed output signals are in logarithmic form and wherein the step of selecting the strongest and next strongest first processed output signals comprises the steps of: forming the sum of the first processed output signals; offsetting the sum by a predetermined amount; comparing each of the first processed output signals with the offset sum; and selecting the first processed output signal with a magnitude above that of the offset sum to be the strongest first processed output signal.

6. The method of claim 5, wherein the step of selecting the strongest and next strongest first processed output signals further comprises the steps of selecting the first processed output signals generated by the two channels which were connected to antenna pairs adjacent to the channel with the selected first processed output signal; comparing the first processed output signals from the selected channels and selecting the stronger of the first processed output signals generated by the two channels to be the next strongest first processed output signal.

7. The method of claim 1, wherein the first processed output signals are in logarithmic form and wherein the step of forming the monopulse ratio comprises the step of: subtracting the strongest and next strongest first processed output signals.

8. The method of claim 1, wherein the step of forming the monopulse ratio comprises the step of: accepting the ratio for angle determination only if adjacent antenna pairs of said first selected set received the strongest and next strongest first processed output signals.

9. The method of claim 1, wherein the step of forming the monopulse ratio comprises the step of converting the monopulse ratio into digital form.

10. The method of claim 1, wherein the step of forming the monopulse ratio comprises the step of temporarily storing the monopulse ratio.

11. The method of claim 1, wherein the step of processing the RF output signals from the antennas in said second selected set comprises, in each case, the steps of: filtering the RF output signal; detecting the filtered signal and logarithmically amplifying the detected signals to form a second processed output signal.

12. The method of claim 1, wherein the step of determining the sector comprises the steps of: comparing the second processed output signals; selecting the greater of the second processed output signals and noting the sector in which the antenna connected to the channel generating the selected second processed output signal is situated.

13. The method of claim 1, wherein the step of determining the angle of arrival comprises the steps of calculating the angle represented by the ratio and placing the calculated angle in the determined sector.

14. Apparatus for obtaining direction finding information in a monopulse radar system of the type having a multi-channel receiver and an antenna array including a plurality of fixed, narrow beamwidth antennas oriented to provide omnidirectional coverage, the apparatus comprising: means for selecting first and second sets of antennas from the array, in sequence, said first set comprising a plurality of pairs of oppositely oriented antennas, said second set comprising the pair of antennas from the previously selected first set generating the strongest processed combined output signal; means for combining the outputs of the antennas in each pair of said first selected set to form a combined output signal for each pair; means for processing each of said combined output signals to form a plurality of processed combined output signals; means for selecting the strongest and next strongest processed combined output signals; means for forming a monopulse ratio from said strongest and next strongest processed combined output signals; means for processing the output signals from the antennas in the second selected set to form second processed output signals; means for selecting the stronger second processed output signal; means for generating a signal representative of the sector in which is situated the antenna in said second selected set generating the selected second processed output signal; and, means for determining the angle of arrival information from said monopulse ratio and said sector representing signal.

15. The apparatus of claim 14, wherein said processing means comprises the receiver channels and wherein said means for selecting said antenna sets comprises electronically controllable switching means operatively interposed between the RF outputs of the antennas and the inputs of the receiver channels and means for controlling the state of said switching means.

16. Apparatus for obtaining direction finding information in a monopulse radar system of the type having a multi-channel receiver and an antenna array including a plurality of fixed, narrow beamwidth antennas oriented to provide omnidirectional coverage, the apparatus comprising: means for selecting first and second sets of antennas from the array, in sequence, said first set comprising a plurality of pairs of oppositely oriented antennas, said second set comprising the pair of antennas from the previously selected first set generating the strongest processed combined output signal; means for combining the outputs of the antennas in each pair of said first selected set to form a combined output signal for each pair; means for processing each of said combined output signals to form a plurality of processed combined output signals, said processing means comprising the receiver channels and wherein said means for selecting said antenna sets comprises electronically controllable switching means operatively interposed between the RF outputs of the antennas and the inputs of the receiver channels and means for controlling the state of said switching means, said switching means comprising first and second tiers of interconnected electronically controllable switches, said first tier comprising a number of switches equal to the number of antennas in the array and said second tier comprising a number of switches equal to the number of receiver channels; means for selecting the strongest and next strongest processed combined output signals; means for forming a monopulse ratio from said strongest and next strongest processed combined output signals; means for processing the output signals from the antennas in the second selected set to form second processed output signals; means for selecting the stronger of said second processed output signals; means for generating a signal representative of the sector in which the antenna, in said second selected set, generating the selected second processed output signal is situated; and, means for determining the angle of arrival information from said monopulse ratio and said sector representing signal.

17. The apparatus of claim 16, wherein each switch in said first tier has a single RF input adapted to be connected to the RF output of a different one of the antennas in the array and first and second RF outputs operably interconnected with the RF inputs of the switches in said second tier.

18. The apparatus of claim 17, wherein each switch in said second tier has three RF inputs adapted to be operably interconnected with the RF outputs of the switches in said first tier and an RF output adapted to be connected to one of the receiver channels.

19. The apparatus of claim 18, wherein said combining means comprises power divider means operably interposed between selected RF outputs of the switches in said first tier and selected RF inputs of the switches in said second tier.

20. The apparatus of claim 15, wherein said controlling means comprises means for generating biasing signals, said biasing signals being effective to control the state of said switching means to cause same to select said first and second antenna sets in sequence.

21. Apparatus for obtaining direction finding information in a monopulse radar system of the type having a multi-channel receiver and an antenna array including a plurality of fixed, narrow beamwidth antennas oriented to provide omnidirectional coverage, the apparatus comprising: means for selecting first and second sets of antennas from the array, in sequence, said first set comprising a plurality of pairs of oppositely oriented antennas, said second set comprising the pair of antennas from the previously selected first set generating the strongest processed combined output signal; means for combining the outputs of the antennas in each pair of said first selected set to form a combined output signal for each pair; means for processing each of said combined output signals to form a plurality of processed combined output signals, said processing means comprising the receiver channels; wherein said means for selecting said antenna sets comprises electronically controllable switching means operatively interposed between the RF outputs of the antennas and the inputs of the receiver channels, wherein said switching means comprises first and second tiers of interconnected electronically controllable switches, said first tier comprising a number of switches equal to the number of antennas in the array and said tiers comprising a number of switches equal to the number of receiver channels and means for controlling the state of said switching means, said controlling means comprising means for generating biasing signals, said biasing signals being effective to control the state of said switching means to cause same to select said first and second antenna sets, in sequence; means for selecting the strongest and next strongest processed combined output signals; means for forming a monopulse ratio from said strongest and next strongest processed combined output signals; means for processing the output signals from the antennas in the second selected set to form second processed output signals; means for selecting the stronger second processed output signal; means for generating a signal representative of the sector in which the antenna, in said second selected set, generating the selected second processed output signal is situated; and, means for determining the angle of arrival information from said monopulse ratio and said sector representing a signal.

22. The apparatus of claim 21, wherein each switch in said first tier has a single RF input adapted to be connected to the RF output of one of the antennas in the array and first and second RF outputs operably interconnected with the RF inputs of the switches in said second tier.

23. The apparatus of claim 22, wherein each switch in said second tier has three RF inputs adapted to be operably interconnected with the RF outputs of the switches in said first tier and an RF output adapted to be connected to one of the receiver channels.

24. The apparatus of claim 23, wherein each switch in said first tier has first and second bias inputs and wherein each switch in said second tier has first, second and third bias inputs, all of said bias inputs being operably connected to the output of said control means.

25. The apparatus of claim 24, wherein said second bias input of each of said switches in said first tier and said third bias input of each of said switches in said second tier are operably connected to receive a first bias signal from said control means to condition said switch means to select said first antenna set.

26. The apparatus of claim 24, wherein said first bias inputs of each of said switches in said first tier are connected to receive a second bias signal from said control means to condition said switch means to partially select said second antenna set.

27. The apparatus of claim 25, wherein said first and second bias inputs of said switches in said second tier are operably connected to receive a third bias signal from said control means to complete selection of said second antenna set.

28. The apparatus of claim 26, wherein said third biasing signal conditions said selecting means to select the antenna pair from the first set which generated the strongest processed output signal.

29. The apparatus of claim 14, wherein said means for combining the outputs of the antennas in said first set comprises power divider means for each antenna pair.

30. The apparatus of claim 14, wherein said means for processing each of said combined output signals comprises means for filtering said combined output signal, means for detecting said filtered signal and means for amplifying said detected signal.

31. The apparatus of claim 30, wherein said amplifying means comprises means for logarithmically amplifying said detected signal.

32. The apparatus of claim 14, wherein said means for selecting the strongest and next strongest processed output signals comprises means for forming the sum of said processed combined output signals; means for offsetting said sum by a predetermined amount; means for comparing each of said processed combined output signals with said offset sum; and, means for selecting the processed combined output signal with a magnitude equal to or greater than the offset sum.

33. The apparatus of claim 32, wherein the means for selecting the strongest and next strongest processed combined output signals further comprises means for selecting the two processed output signals from antenna pairs adjacent the selected antenna pair generating the strongest processed combined output signal; means for comparing the two selected processed combined output signals, means for selecting the greater of the two selected processed combined signals to be the next strongest processed combined output signal.

34. The apparatus of claim 14, wherein said monopulse ratio forming means comprises means for subtracting the strongest and next strongest processed combined output signals.

35. The apparatus of claim 14, wherein said means for processing the output signals from the antennas in said second set comprises said means for processing said combined output signals.

36. The apparatus of claim 14, wherein said means for determining the angle of arrival information comprises a look-up table circuit.

* * * * *